(12) United States Patent
Kloster et al.

(10) Patent No.: US 11,168,659 B2
(45) Date of Patent: Nov. 9, 2021

(54) SUBSEA ENERGY STORAGE

(71) Applicant: Subsea 7 Norway AS, Stavanger (NO)

(72) Inventors: Ernst Kristen Helgoy Kloster, Stavanger (NO); Stale Moen Tonnessen, Hundvag (NO); Argyrios Akritidis, Stavanger (NO)

(73) Assignee: Subsea 7 Norway AS, Stavanger (NO)

( * ) Notice: Subject to any disclaimer, the term of this patent is extended or adjusted under 35 U.S.C. 154(b) by 0 days.

(21) Appl. No.: 16/643,308

(22) PCT Filed: Aug. 30, 2018

(86) PCT No.: PCT/EP2018/073360
§ 371 (c)(1),
(2) Date: Feb. 28, 2020

(87) PCT Pub. No.: WO2019/043105
PCT Pub. Date: Mar. 7, 2019

(65) Prior Publication Data
US 2020/0347815 A1 Nov. 5, 2020

(30) Foreign Application Priority Data
Aug. 30, 2017 (GB) ..................... 1713909

(51) Int. Cl.
*F03B 13/06* (2006.01)
*F03B 13/08* (2006.01)
(Continued)

(52) U.S. Cl.
CPC .............. *F03B 13/06* (2013.01); *F03B 13/08* (2013.01); *F16L 1/16* (2013.01); *H02K 7/1823* (2013.01); *F05B 2240/97* (2013.01)

(58) Field of Classification Search
CPC . F03B 13/06; F03B 13/08; F16L 1/16; H02K 7/1823; F05B 2240/97
See application file for complete search history.

(56) References Cited

U.S. PATENT DOCUMENTS 4,321,475 A 3/1982 Grub
4,363,566 A 12/1982 Morton
(Continued)

FOREIGN PATENT DOCUMENTS

DE 102011013329 9/2012
DE 102011118206 5/2013
(Continued)

OTHER PUBLICATIONS

Translation of DE 10 2012 100981 A1 (original included on IDS) (Year: 2012).*
(Continued)

*Primary Examiner* — Sean Gugger
(74) *Attorney, Agent, or Firm* — Levy & Grandinetti

(57) ABSTRACT

A subsea energy storage installation comprises a pumped-storage system having pumping and hydropower generation components for, selectively, converting electricity into potential energy by expelling water from within a tank into the surrounding sea and for generating electricity from an incoming flow of water re-entering the tank under hydrostatic pressure. The tank comprises at least one elongate rigid pipeline that may be lowered to the seabed as part of a towable unit or laid on the seabed as a pipe string launched from a surface vessel.

41 Claims, 7 Drawing Sheets

(51) Int. Cl.
*F16L 1/16* (2006.01)
*H02K 7/18* (2006.01)

(56) References Cited

U.S. PATENT DOCUMENTS

| | | | |
|---|---|---|---|
| 6,347,910 B1 * | 2/2002 | Morishige | E02B 17/00 |
| | | | 405/210 |
| 9,617,970 B2 | 4/2017 | Schmidt-Bocking et al. | |
| 2014/0028028 A1 | 1/2014 | Frye | |
| 2015/0042095 A1 * | 2/2015 | Lin | F03B 13/12 |
| | | | 290/53 |
| 2015/0361948 A1 * | 12/2015 | Schmidt-Boecking | |
| | | | F03B 13/10 |
| | | | 290/54 |

FOREIGN PATENT DOCUMENTS

| | | |
|---|---|---|
| DE | 102012100981 | 8/2013 |
| DE | 102012011492 | 12/2013 |
| DE | 102014115860 | 3/2016 |
| EP | 2 683 933 | 1/2014 |
| GB | 2478218 | 8/2011 |
| JP | 2-296692 | 12/1990 |
| JP | 10-37840 | 2/1998 |
| WO | WO 2009/111861 | 9/2009 |
| WO | WO 2009/123465 | 10/2009 |
| WO | WO 2011/099014 | 8/2011 |
| WO | WO 2011/117607 | 9/2011 |
| WO | WO 2013/117329 | 8/2013 |

OTHER PUBLICATIONS

Lim, Saniel D. et al., "Conceptual design of ocean compressed air energy storage system," 2012 Oceans Conference, Oct. 14-19, 2012 (available online from Marine Technology Society Journal, vol. 47, No. 2, Mar.-Apr. 2013).
American Petroleum Institute (API) Specification 17J.
American Petroleum Institute (API) Recommended Practice 17B.

* cited by examiner

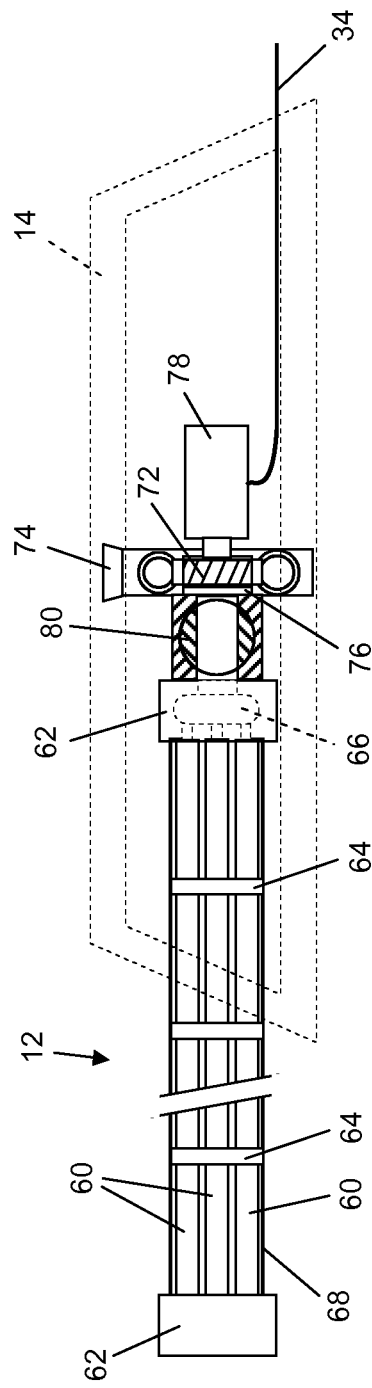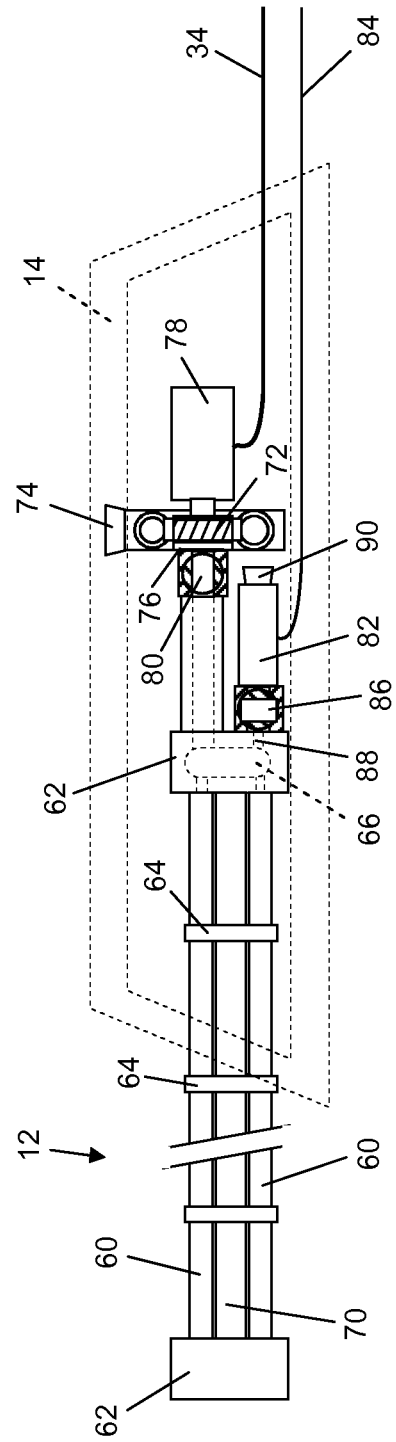

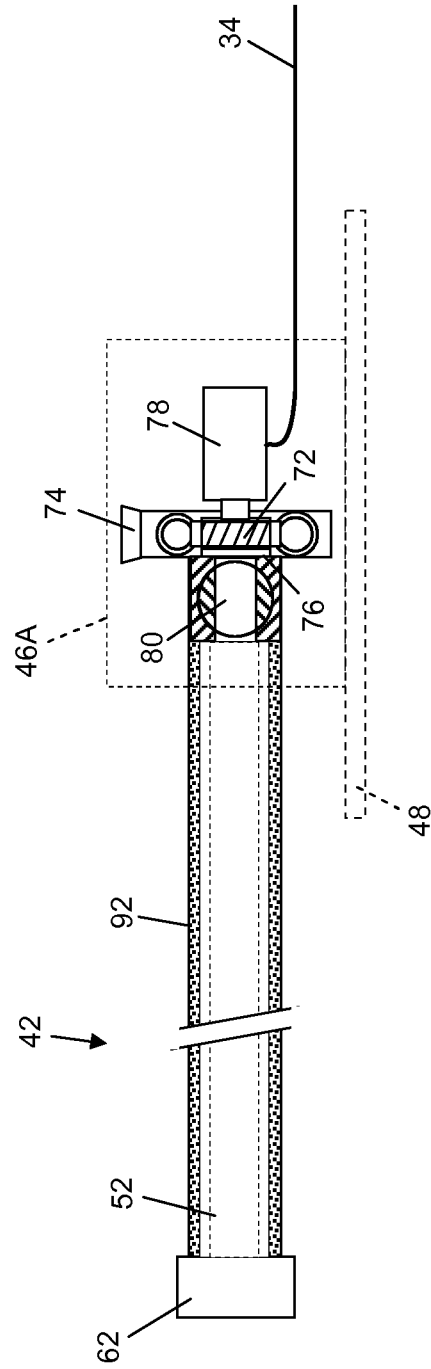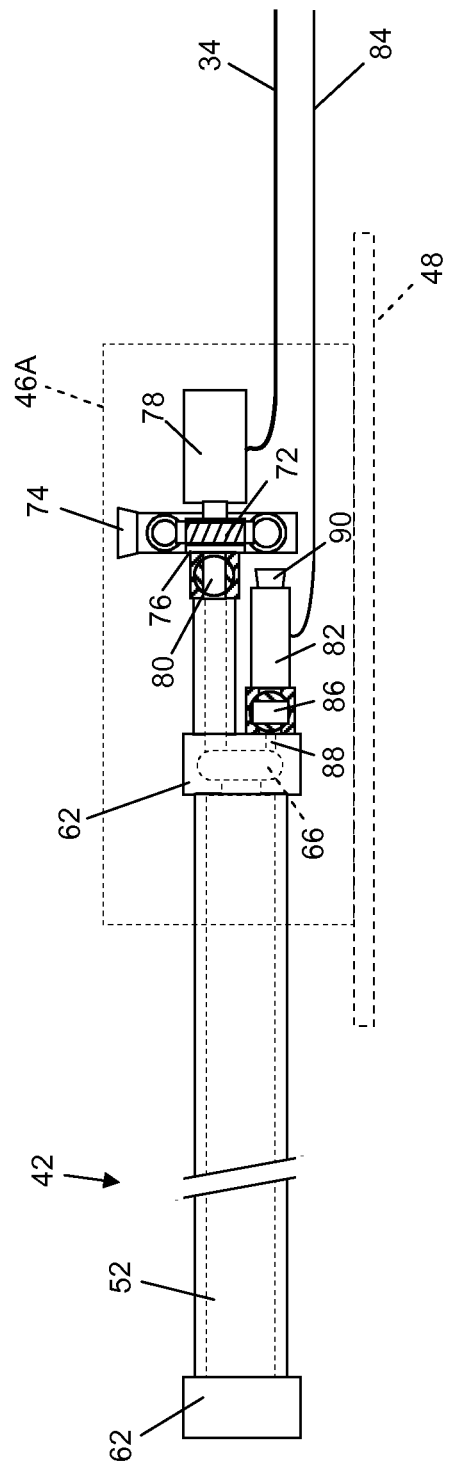

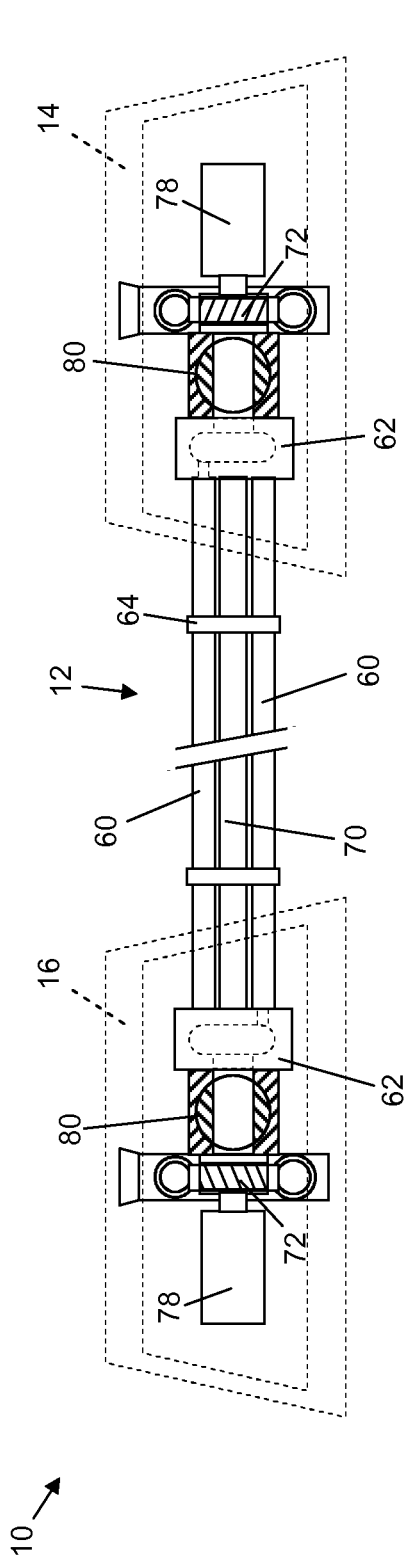
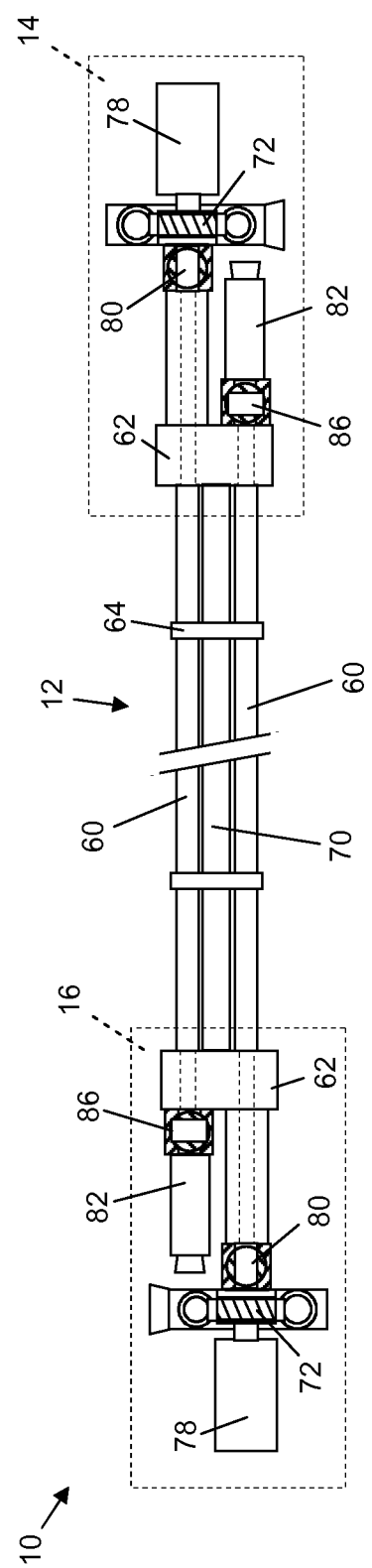
Figure 8
Figure 9

SUBSEA ENERGY STORAGE

This invention relates to the storage of energy underwater, using subsea energy storage systems for the purpose of generating electricity on demand.

When operating electrical power grids, it is a well-known challenge to match the supply of electricity to rapidly-fluctuating demand. Conversely, the use of intermittent power sources such as solar, wind and other renewables results in short-term fluctuations in generating capacity.

Even a transient mismatch between the supply and demand of electricity can cause an unacceptable variation in supply frequency across the grid. Consequently, it is routine to employ a mixture of generating assets with different attributes. Those assets typically comprise continuously-operating base-load sources, such as power stations powered by gas, coal or nuclear energy, and faster-reacting short-term sources, such as generators powered by gas turbines or diesel engines.

In addition, it is common for electrical power grids to employ load-balancing measures that involve temporary storage of energy. Energy may be stored in various ways, for example as electrochemical energy in batteries or as potential energy in reservoirs, such as are used in pumped-storage hydroelectricity schemes. Other, less mature, energy-storage solutions include the use of flywheels or of compressed air. In each case, the stored energy can be released almost instantly to supply or to generate electricity on demand.

Elegantly, excess electricity from periods of low demand can be converted into electrochemical or potential energy to be saved for periods of higher demand. Typically this involves using the excess electricity to charge batteries or to pump fluids to higher heads or pressures. The fact that such an arrangement must be a net consumer of electrical energy is outweighed by benefits to the overall grid system, including more efficient use of base-load sources and minimising overcapacity of very expensive generating assets.

Energy is stored and discharged cyclically, most typically on a daily cycle reflecting different levels of demand for electricity during daytime and night-time periods. However to maintain control of the power grid, storage and discharge actions may be planned and executed on timescales ranging from days to seconds.

There is an increasing need for electrical power grids to be supplemented by short-term, quick-reacting energy storage systems. That need is driven by both supply-side and demand-side challenges. The main supply-side challenge is the increased reliance upon renewable energy sources, which can only provide a discontinuous or intermittent supply. A major demand-side challenge is how to recharge the rapidly-growing number of electrically-powered vehicles.

As a result, there is a need to find additional ways of storing very large amounts of energy that can be accessed quickly enough to generate electricity on demand. However, provision of sufficiently large battery installations and pumped-storage schemes would be extremely complex and expensive and raises significant environmental and planning concerns. Also, battery installations are prone to degrade with repeated charge/discharge cycles over a period of time.

Subsea power generation has not yet been adopted widely. For example, US 2014/028028 teaches an offshore power plant for generating electricity by using a venturi-like structure to extract kinetic energy from ocean currents. The efficiency of such a system is questionable and there is no means for storing energy. Also, on its own admission, the system depends upon the availability of offshore sites with fast-moving and reliable currents. Reliance is also placed upon massive subsea structures that would be complex and expensive and that would make implementation in deep water impractical.

Subsea energy-storage solutions have also been proposed to counter at least some of the problems of land-based energy-storage installations. For example, WO 2009/123465 teaches a pumped-storage power plant that is designed for use in marine environments. In accordance with principles that are well known onshore, the power plant uses a pump/turbine system and a pressure differential between reservoirs containing water at different levels to store and generate hydroelectric energy.

WO 2009/123465 suggests that the sea itself may serve as an upper-level reservoir and that the lower-level reservoir may be a tank on the seabed from which water is emptied into the surrounding sea to store potential energy in the sea.

Like its onshore pumped-storage counterparts, the power plant of WO 2009/123465 relies upon the fall of water to drive the turbine. Thus, a tubular shaft extends from the bottom of the lower-level reservoir to near the surface. Also, air from the surface is drawn into the lower-level reservoir as water is pumped out, preferably above the surface. However, the structures required to enable those surface-to-seabed flows of water and air are impractical to implement in deep water. Also, it is desirable to minimise or to avoid permanent surface installations, particularly far offshore or in deep water.

Similarly, U.S. Pat. No. 4,321,475 discloses an underwater energy storage tank. During off-peak periods of low electricity demand or when a connected wind turbine is active, water is pumped out of the tank and replaced by air drawn in from above the surface. To release the stored energy in times of high energy demand, surrounding water is admitted back into the tank under differential hydrostatic pressure. Air from inside the tank is displaced back to the surface as the incoming flow of water drives a turbine and generator.

The arrangement disclosed in U.S. Pat. No. 4,321,475 is suitable only for use at a shallow depth, at or just under the surface, because a large air-filled tank would otherwise collapse under hydrostatic pressure. Again, it would be undesirable or impractical to implement such an arrangement far offshore or in deep water. Also, the limited hydrostatic pressure at shallow depth limits the efficiency of power generation.

In contrast, EP 2683933 describes an energy storage solution for use in deep water, in which no provision is made to draw in air from the surface. Here, a storage tank is located on the seabed and can again be emptied of water by a pump. As in the aforementioned prior art, the resulting pressure differential between the seawater and the inner cavity of the tank stores potential energy in the surrounding sea. When electricity generation is required, water is admitted back into the tank under hydrostatic pressure. A turbine in the incoming water flow drives a generator to produce electrical current, which is transmitted via a power supply network.

The detailed embodiments of EP 2683933 demonstrate that the key technical challenge has little to do with its simple principle of operation. Instead, the challenge lies in how to build and install a sufficiently large subsea storage tank that will cope with the problems of hydrostatic pressure and buoyancy management during construction, installation and use. Thus, EP 2683933 proposes that the storage tank should be spherical or toroidal and should comprise additional features for ballasting and deballasting on installation and retrieval. Likewise, DE 102012011492 teaches that a subsea energy storage tank, in this case for holding compressed air, has to be ballasted or anchored to a foundation because of variations of buoyancy in use.

EP 2683933 tacitly admits that its proposed pressure-resistant tank designs suffer from a major problem, which is that their internal volume is limited by the constraints of construction techniques, hydrostatic pressure and buoyancy management. Thus, to provide a workable aggregate volume for energy storage, several such storage tanks have to be placed close together on the seabed and interconnected electrically and/or coupled fluidly. Similarly, WO 2013/117329 discloses another combination of short cylindrical subsea storage tanks, which may be manifolded together to use a common turbine and pump.

Using multiple separately-installed storage tanks like those disclosed in EP 2683933 and WO 2013/117329 greatly increases the cost and complexity of installation and tends to reduce reliability. In this respect, it will be evident that the necessary electrical connections and fluid couplings have to be effected deep underwater after the storage tanks have been lowered individually to the seabed.

The use of bigger storage tanks is not practical, unless in shallow water, because of the risk of collapse or crushing under hydrostatic pressure. Yet, greater hydrostatic pressure and hence deeper water is desirable to achieve greater efficiency. Consequently, a trade-off is required for the tank to avoid collapse in deep water: the tank has to be smaller and/or have thicker walls and so may not have the volume to admit a sufficient flow rate of water for long enough to enable useful electricity generation.

Other forms of energy storage are described in DE 10/2014/14115860 and a paper by Lim et. al published for the '2012 Oceans' conference held in October 2012 and entitled "Conceptual design of ocean compressed air energy storage system". The former describes a gas pressure energy storage network, in the form of a pipeline, located on the seabed and connected to a main power-generating plant at the surface. The latter discusses the storage of compressed air in storage structures underwater; to generate electricity, the compressed air is recovered for combustion with natural gas and exhausted through a turbine. WO 2009/111861 describes a submerged energy generation and storage system utilising submerged modular storage reservoirs mounted on the bottom of the body of water.

The invention arises from the continuing need to provide a subsea energy storage system that can be constructed easily and installed easily on the seabed and that can withstand the hydrostatic pressure of deep water. Yet, the system should have an internal volume that is large enough to avoid the need for multiple installation operations.

Against this background, the invention resides in a subsea energy storage installation, comprising: a rigid tank submerged in the sea; and a pumped-storage system having pumping and hydropower generation components for, selectively, converting electricity into potential energy by expelling water from within the tank into the surrounding sea and for generating electricity from an incoming flow of water re-entering the tank under hydrostatic pressure; wherein the tank comprises at least one elongate rigid pipeline, which is preferably at least 500 m long, lowered to a seabed location as part of a towable unit or laid at a seabed location as a pipe string.

Conveniently, the towable unit or the pipe string may incorporate the components of the pumped-storage system. For example, those components could be located at one or both of opposed ends of the pipeline, such as in at least one towhead of a towable unit that includes the pipeline or in at least one terminal module of a pipe string that forms the pipeline.

It is also possible for the components of the pumped-storage system to be located at one or more intermediate locations between opposed ends of the pipeline. For example, those components may be located in at least one in-line module of a pipe string that forms the pipeline or may be offset from, and connected by a spool or jumper pipe to, such an in-line module.

Preferably, the components of the pumped-storage system are located together at substantially the same location with respect to the length of the pipeline. However, it is possible instead for those components to be distributed at different locations with respect to the length of the pipeline.

The components of the pumped-storage system may comprise: at least one pump for expelling water from the pipeline; and at least one machine-driven generator for generating electricity from the incoming flow of water. The machine is preferably a turbine.

The pump and the machine suitably communicate with the pipeline through a common manifold and/or a common bulkhead, which may also serve as a manifold. However, it is also possible for the pump and the machine to communicate with the pipeline at different longitudinal locations, for example through respective bulkheads.

The components of the pumped-storage system may comprise at least one reversible machine, such as a reversible turbine, coupled to a generator/motor, the machine being driven by the generator/motor to expel water from the tank and, conversely, driving the generator/motor to generate electricity from the incoming flow of water.

A towable unit used in the invention preferably comprises a bundle of parallel pipes. The pipes of the bundle may be joined to form a common volume, for example by being joined at their ends by a manifold, which may be defined by a bulkhead that is common to the pipes of the bundle. It is also possible for the pipes of the bundle to be closed by at least one common bulkhead. Indeed, the pipes of the bundle could be separate from each other and have respective pumped-storage systems.

The pipes of a bundle could be contained within a carrier pipe, which may be flooded or may define a sealed chamber that is resistant to hydrostatic pressure. It is also possible for the pipes of the bundle to surround a core pipe. In that case, the core pipe and the pipes of the bundle could be joined to form a common volume.

Preferably the pipeline is anchored to the seabed, for example at intervals along its length. It is also possible to stabilise the pipeline with a weight coating.

The installation may support at least one tidal turbine to generate supplemental electricity.

Preferably the pumped-storage system has an inlet for receiving the incoming flow of water and an outlet for expelled water that are both at substantially the same depth in the sea as the tank.

The inventive concept may also be expressed as a method of installing a subsea energy storage installation. In one expression, that method comprises: towing to an offshore installation site a unit that comprises at least one elongate rigid pipeline to serve as a subsea tank and at least one support structure for pumping and hydropower generation components of a pumped-storage system; and lowering the unit to a seabed location at the installation site.

The unit may be lowered with the pumping and hydropower generation components mounted on the support structure. The support structure may be used as a towhead at an end of the pipeline when towing the unit. Before towing, the unit may be fabricated and tested at an inshore or onshore location. Fabrication may involve assembling a bundle of elongate rigid pipelines.

In another expression, the method of the invention comprises: at an offshore installation site, launching a pipe string overboarded from an installation vessel at the surface to a seabed location to serve as a subsea tank; and incorporating one or more modules into the pipe string at the surface, the or each module being a support structure for at least one pumping or hydropower generation component of a pumped-storage system. The or each module may be launched with pumping or hydropower generation components mounted thereon.

At least one module may be incorporated at an end of the pipe string or at an intermediate position between opposed ends of the pipe string.

A subsea power cable may be connected to at least one pumping or hydropower generation component, for example when the or each component is at the seabed location.

In summary, the invention provides a hydro-power plant that is placed on the seabed and used for storage of energy by subjecting an evacuated volume to external hydrostatic pressure. Thus, energy is stored hydraulically. For this purpose, the power plant uses a subsea tank that has a slender and long shape comprising either a single length of large-diameter pipe or multiple pipes joined together as a bundle. The or each pipe may be of steel or plastics, including composite layered structures and composite materials of reinforced plastics.

The tank is charged by emptying it of water using one or more pumps that may be powered mechanically, for example hydraulically, or electrically. To generate electricity, the tank is flooded with water entering under hydrostatic pressure, the incoming water passing through one or more turbines that drive generators.

Thus, when the tank is full of water, the storage system is discharged and when the tank is empty the system is charged. The hydrostatic pressure at the seabed corresponds to the static head above water, where water depth equates to elevation.

The tank may contain, and trap, one or more pockets of gas such as air or water vapour that expand under reduced pressure as water is pumped out and that collapse under hydrostatic pressure as water is readmitted.

Water depth, seabed topography and soil conditions will govern the size, shape and material of the tank. Output and input specifications will govern the charging and discharging solution. The fabrication site and installation method will also influence the final design. The buoyancy of the tank when charged (i.e. empty) and its weight when discharged (i.e. full) will be used together with these other factors to determine the optimal dimensions.

One concept of the invention is to use existing bundle fabrication sites at which to bundle together multiple pipes. A few or several pipe structures may be combined as a bundle, with or without an external carrier pipe. Pipe structures may, for example, be bundled with or within a hydrostatically-strong pipe with large volume. The tank may be protected and reinforced with a concrete weight coating or other material to increase its resistance to the hydrostatic pressure and/or to adjust its buoyancy. Anchors, piles or suction skirts can be used to secure the tank to the seabed.

Embodiments of the invention provide a subsea energy storage system comprising at least one elongate pipeline structure, which may for example be more than 500 m long. The storage system is electrically connected to a power grid and comprises at least one pump for evacuating fluid contained within the elongate pipeline structure to the surrounding sea. The storage system further comprises at least one turbine for producing electric power while admitting seawater into the elongate pipeline structure.

The turbine and pump may be located at respective longitudinally-spaced positions along the elongate pipe structure, for example at opposite ends of the pipe structure. However, it is preferred that the turbine and pump are located at the same longitudinal position, for example at the same end of the pipe structure, as this reduces the length of cabling required.

The turbine and pump may be combined in a reversible pump/turbine unit. For example, the pump/turbine unit may comprise a Francis turbine.

The system of the invention is preferably anchored to the seabed, for example by stapling or pinning the elongate pipe structure to the seabed or by attaching the pipe structure to a foundation that may comprise one or more piles.

The elongate pipe structure may be assembled wholly or partially offshore or wholly or partially onshore. For example, a single pipe section is apt to be fabricated offshore during laying or a bundled pipe structure is apt to be assembled onshore and towed offshore before being lowered to the seabed.

The system of the invention may comprise at least one head structure at an end of the elongate pipe structure. For example, at least one end of a bundle of pipe structures may be connected to a head structure.

A head structure may comprise the at least one turbine and/or the at least one pump. The head structure may further comprise electrical cable connections and is preferably designed as a towhead for towing the subsea energy storage system.

The system of the invention may further comprise or support at least one tidal turbine to be driven by subsea currents.

The subsea energy storage system of the invention suitably comprises a control system that is configured to switch between production, storage or stand-by modes. Such switching may be performed automatically in response to grid parameters, such as supply frequency.

Embodiments of the invention also provide a method to manufacture and install a subsea energy storage system comprising at least one elongate pipe structure. The method comprises: assembling onshore the elongate pipe structure and at least one pump and at least one water turbine; towing the storage system to site; sinking the storage system onto the seabed; and anchoring the storage system into the seabed. At least one electrical power cable is connected to the storage system before or after landing the system on the seabed.

The invention is primarily concerned with rigid pipelines or bundles of such pipelines, whether the pipes are or steel or are of polymers or composites that have elastic flexibility akin to steel pipes. In this respect, those skilled in the art understand that nominally 'rigid' pipes have enough flexibility to be bent if a minimum bend radius is observed. Yet, such pipes are not regarded in the art as being 'flexible'.

Flexible pipes used in the subsea oil and gas industry are specified in API (American Petroleum Institute) Specification 17J and API Recommended Practice 17B. The pipe body is composed of a composite structure of layered materials, typically comprising polymer tubes and wraps to ensure fluid-tightness and steel layers or other elements, such as interlocked steel tapes or wires, to provide mechanical strength. Flexible pipes are typically manufactured continuously to the desired length between steel end fittings.

A rigid pipe usually consists of or comprises at least one pipe of solid steel or steel alloy. However, additional elements can be added to form a composite structure, such as an internal liner layer or an outer coating layer. Such additional elements can comprise polymer, metal or composite materials. Rigid pipe joints are typically terminated by a bevel or a thread, and are assembled end-to-end by welding or screwing them together.

Polymer or composite pipes are rigid pipes whose structural strength, in terms of resistance to bending along their length, is derived wholly, substantially or predominantly from one or more polymer or composite materials, as distinct from composite structures. Typically, composite pipes comprise layers of angled polymer wraps. WO 2011/117607 discloses an example of a polymer composite pipe based on PEEK (polyetheretherketone). Again, steel end fittings are typically used.

In order that the invention may be more readily understood, reference will now be made, by way of example, to the accompanying drawings in which:

FIG. 4 is a schematic side view of a turbine and pump arrangement integrated into a towhead of the embodiment shown in FIGS. 1 and 2;

FIG. 5 is a schematic side view of an alternative turbine and pump arrangement integrated into a towhead of the embodiment shown in FIGS. 1 and 2;

FIG. 6 is a schematic side view of a turbine and pump arrangement integrated into a pipeline accessory of the embodiment shown in FIG. 3;

FIG. 7 is a schematic side view of an alternative turbine and pump arrangement integrated into a pipeline accessory of the embodiment shown in FIG. 3;

FIG. 8 is a schematic side view of a subsea power plant of the invention comprising a pipeline bundle like that shown in FIGS. 1 and 2 and having turbine and pump arrangements integrated into both towheads;

FIG. 9 is a schematic plan view of a subsea power plant of the invention comprising a pipeline bundle like that shown in FIGS. 1 and 2 and having alternative turbine and pump arrangements integrated into both towheads;

Figure 1:
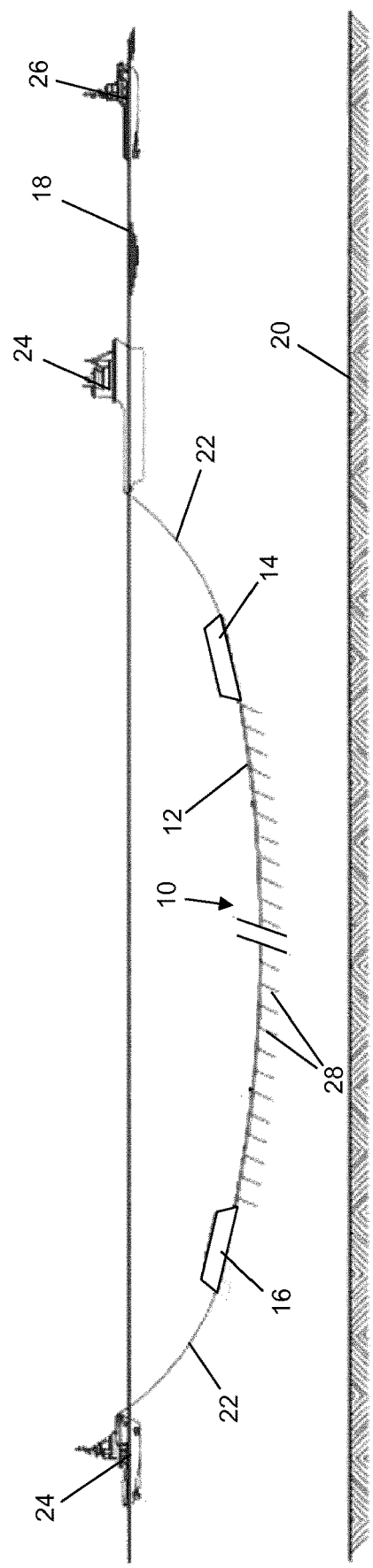
FIG. 1 is a schematic side view of a subsea power plant in a first embodiment of the invention comprising a pipeline bundle between two towheads, shown here being towed to a subsea installation site using the controlled depth towing method known in the prior art.
Figure 2:
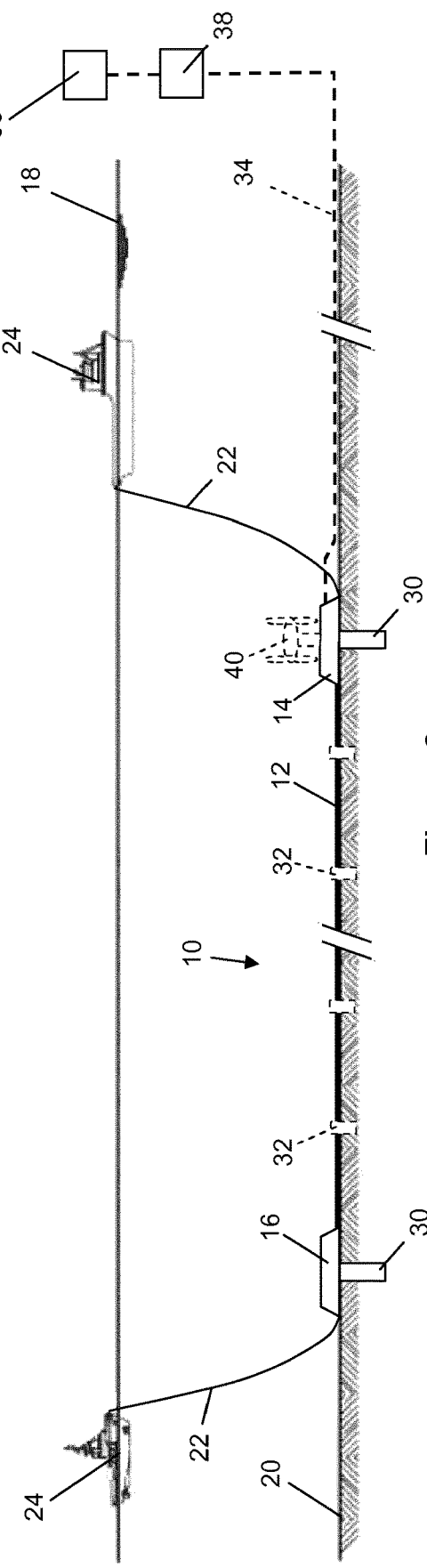
FIG. 2 is a schematic side view of the power plant of FIG. 1 now laid on the seabed and connected to a power grid.

Referring firstly to FIGS. 1 and 2, these drawings show a subsea power plant of the invention embodied as a towable bundle unit 10. The unit 10 comprises a pipeline bundle 12 connecting a leading towhead 14 and a trailing towhead 16. The bundle 12 comprises two or more substantially parallel pipes that extend substantially the full length of the bundle 12 between the towheads 14, 16.

Pipes of the bundle 12 serve as one or more energy storage tanks that can be of any reasonable length, and therefore of any internal capacity that may reasonably be required. Such a unit 10 has proven resistance to hydrostatic pressure and can be fabricated and installed in a single operation using well-known and reliable methods.

As is well known in the art and as will be shown in later drawings, pipes of the bundle 12 may be surrounded by an external carrier pipe. A carrier pipe and/or the pipes within any carrier pipe may be configured to resist the hydrostatic pressure at the operational depth. Alternatively, exposed pressure-resistant pipes of the bundle 12 may be clustered around a central core pipe or spine. A central core pipe may itself be pressure-resistant to add energy-storage capacity to the bundle 12 or it may remain flooded to act solely as a structural element.

The various pipes of the bundle 12 are typically of steel but any of them could be largely of polymers or of composite materials. Additional layers or components can be added to the pipes, such as an internal liner or an outer coating. Such additional layers or components may comprise polymer, metal or composite materials. Also, pipes can be single-walled or of double-walled pipe-in-pipe (PiP) construction.

Other elongate elements such as auxiliary pipes and cables may be included in the bundle 12, extending in parallel with the other pipes of the bundle 12 in well-known fashion to carry fluids, power and data signals between the towheads 14, 16. As is conventional, longitudinally-distributed transverse spacers may hold the various pipes and other elongate elements of the bundle 12 relative to each other.

A typical pipeline bundle 12 is a few kilometres in length, for example about 2 km long. Its maximum length may be constrained by the availability of land at onshore fabrication facilities such as spoolbases or yards, However, a pipeline bundle 12 can be made longer by fabricating it from multiple bundle sections attached end-to-end. In principle, therefore, a bundle 12 assembled from two or more such bundle sections could be of any reasonable length.

Thus, the unit 10 is shown in FIGS. 1 and 2 both interrupted and greatly shortened. Also, the depth of the water between the surface 18 and the seabed 20 will usually be much greater than these schematic views would suggest. References in this specification to the sea are intended to encompass use of the invention in other suitably deep bodies of water, in particular lakes.

Either or both of the towheads 14, 16 contain turbine and pump arrangements, examples of which will be described with reference to later drawings. In this way, after the unit 10 has been installed, water can be pumped from within the pipes of the bundle 12 into the surrounding sea, to be readmitted through the or each turbine under hydrostatic pressure to drive a generator that produces electricity on demand.

Integrating the bundle 12 and the towheads 14, 16 to form the towable unit 10 allows the unit 10 to be prefabricated, assembled and tested onshore or in sheltered water before it is towed offshore for installation. Conveniently, therefore, multiple elongate elements can be towed together to an installation site as a single integral unit and installed on the seabed simultaneously in one operation. Reducing the number of subsea-connected interfaces simplifies the installation process and improves the reliability of the system, as compared with connecting units at a subsea location and performing tests there instead.

The towheads 14, 16 incorporate buoyancy, or provide for buoyancy to be attached, to offset their weight during towing. For example, buoyancy may be added directly to the towheads 14, 16 by attaching buoys or buoyancy modules to them.

The bundle 12 may also contribute buoyancy to the unit 10 by virtue of air or other gas contained within a sealed carrier pipe. However, as noted above, an external carrier pipe is optional; pipes of the bundle 12 may instead be clustered around a central core pipe or spine. Additional external buoyancy may also be provided on, or attached to, a carrier pipe, a core pipe or other pipes of the bundle 12.

Various towing methods may be used to transport the unit 10 to an offshore installation site. In particular, the unit 10 may be towed at various depths in the water. The choice of towing depth involves a trade-off between various factors. For example, the unit 10 may be surface-towed at or near to the surface 18, which is easiest to manage. However, surface water dynamics may generate fatigue in the pipeline bundle 12, which is the limiting factor that determines the allowable tow distance. Conversely, towing near the seabed 20 protects the bundle 12 from the influence of surface water dynamics and limits risks during subsequent lowering to the seabed 20 at the installation site. However, controlling the unit 10 is more challenging at depth and is only feasible if the contours of the seabed 20 permit.

FIG. 1 shows the preferred option of a mid-water towing method in which the unit 10 is towed at an intermediate depth in the water column between the surface 18 and the seabed 20. Here, the unit 10 is safely clear of the contours of the seabed 20 and is beneath significant influence from wave action near the surface 18. Specifically, FIG. 1 shows a favoured mid-water towing method known in the art as the 'controlled-depth towing method' or CDTM, as described in U.S. Pat. No. 4,363,566.

Mid-water towing is a good compromise that ensures low-stress installation without the use of large crane vessels that depend on low sea states. This makes installation less weather-sensitive and reduces the cost of installation vessels significantly. However, mid-water towing requires precise management of buoyancy.

In all towing methods, the unit 10 is held in tension by chains or lines 22 extending fore and aft from the respective towheads 14, 16 to respective installation vessels such as tugs 24. The bundle 12 acts in tension between the towheads 14, 16 during towing, with tensile loads being borne principally by a carrier pipe or core pipe of the bundle 12.

The speeds of, and spacing between, the tugs 24 are adjusted to keep the unit 10 at the required depth having regard to the effect of drag forces and tension in the chains 22. Optionally, a third patrol/survey vessel 26 ahead of the leading tug 24 surveys the route and monitors the towing operation.

In the CDTM, the bundle 12 is made neutrally or slightly negatively buoyant at the required depth by the addition of buoyancy and/or ballast chains spaced along its length. In the example shown, ballast chains 28 spaced along the bundle 12 add weight that offsets the buoyancy of the bundle 12. As a result of the added ballast weight, the bundle 12 hangs between the towheads 14, 16 as a catenary.

When the unit 10 reaches an installation site, the unit 10 is lowered toward the seabed 20 while the lines 22 are paid out from the tugs 24. The unit 10 can be lowered to the seabed 20 by removing external buoyancy from the unit 10 or by adding ballast to the unit 10. The unit 10 then settles on the seabed 20 as shown in FIG. 2, with the bundle 12 resting on and supported by the seabed 20 between the towheads 14, 16.

FIG. 2 shows the towheads 14, 16 landed on and supported by pre-installed foundations 30. The foundations 30 may, for example, be embedded structures such as suction piles or pin piles. Alternatively, all or part of the foundations 30 could be integrated with the towheads 14, 16 or be installed after the towheads 14, 16 have been landed on the seabed 20.

FIG. 2 also shows, in dashed lines, features that are apt to be installed after the unit 10 has been installed. Specifically, anchors 32 such as staples or pins are spaced along the bundle 12 to fix the bundle 12 to the seabed 20. Also, a power cable 34 connects the unit 10 to an electrical power grid 36 via a control system 38, both of which may be situated wholly or partially above the surface 18 or on land. Finally, a tidal turbine 40 for generating supplemental electricity from subsea currents uses the leading towhead 14 as a convenient foundation or support. The tidal turbine 40 is of course apt to be supported by either or both of the towheads 14, 16. In principle, it may instead be possible to connect a power cable 34 and/or a tidal turbine 40 to the unit 10 before towing or installing the unit 10.

Figure 3:
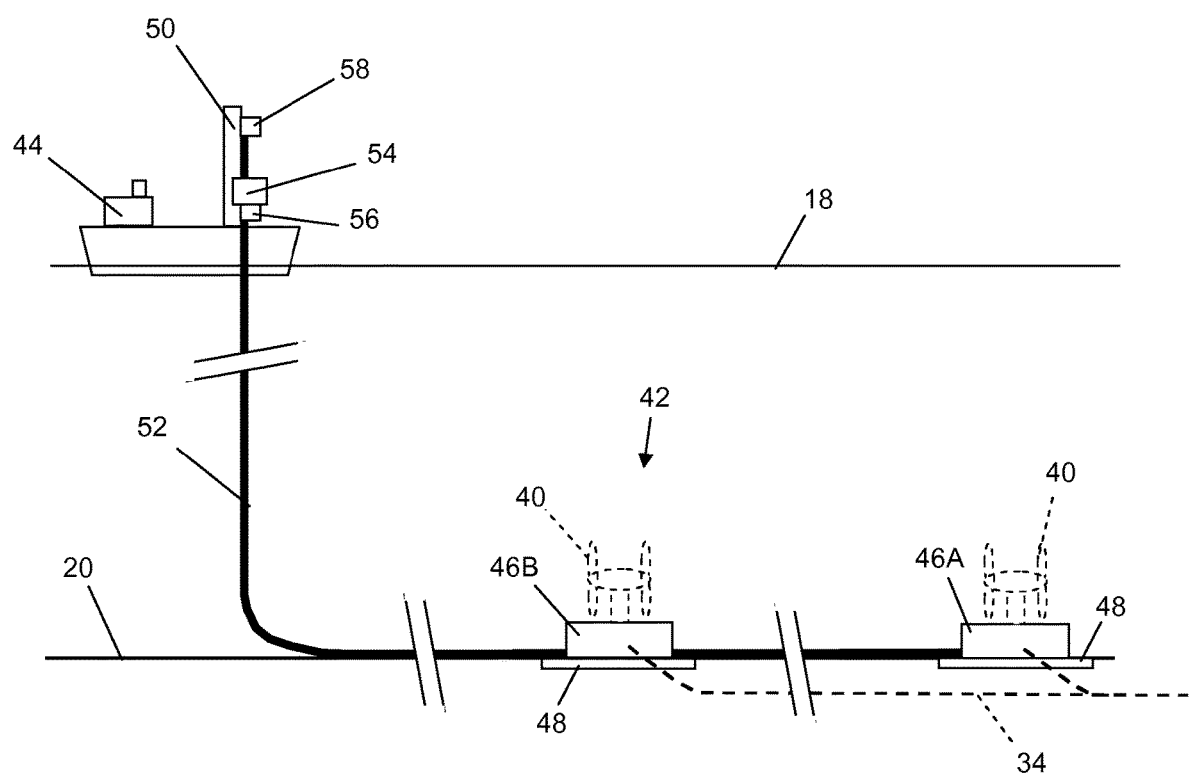
FIG. 3 is a schematic side view of another embodiment of the invention, here showing a J-lay vessel in the process of installing a subsea power plant by laying a pipeline comprising integrated power-generating and pumping accessories.

Turning next to FIG. 3 of the drawings, in which like numerals are used for like features, this illustrates another embodiment of the invention. This schematic drawing is not to scale; for example, again, the water depth will be very much greater than is represented schematically here.

FIG. 3 shows an alternative subsea power plant that exemplifies how a subsea energy storage tank could instead be defined by a pipeline 42 launched from an installation vessel 44 on the surface 18. During installation, the pipeline 42 hangs as a catenary from the installation vessel 44 toward the seabed 20. In principle, depending upon its materials and dimensions and the depth of water, the pipeline 42 could be installed by any method for installing subsea pipelines as known in the art, such as reel-lay, S-lay or J-lay. A J-lay operation is shown here by way of example.

Conveniently, as shown in FIG. 3, the pipeline 42 may include modules 46, any or all of which may comprise integral pumping and turbine facilities like those of the towheads 14, 16 in the first embodiment. Such modules 46 may be disposed at an end of a pipeline 42 or may be inserted within the length of a pipeline 42. The modules 46 are therefore analogous to well-known pipeline accessories such as in-line tee assemblies (ILTs or ITAs), pipeline end manifolds (PLEMs) and pipeline end terminations (PLETs). Thus, using well-known techniques, the modules 46 may be incorporated into the pipeline 42 as it is launched into the sea.

The modules 46 are exemplified here by a terminal or end module 46A welded to an end of the pipeline 42 and an optional in-line module 46B welded between neighbouring sections of the pipeline 42 disposed end-to-end. Another terminal or end module 46A will be welded in due course to the other end of the pipeline 42, to close and seal that end of the pipeline 42 on completion.

Any or all of the modules 46 comprises fluid-handling equipment such as valves, pumps and/or turbines in fluid communication with the pipeline 42 and/or ancillary equipment such as generators and motors. That equipment is supported mechanically by a structural frame. As is conventional, the modules 46 could have mudmat foundations 48 as shown but other foundations such as the aforementioned piles of the first embodiment could be used instead.

The pipeline 42 may be of single-walled construction or could instead be of twin-walled pipe-in-pipe (PiP) construction. Again, the pipeline 42 may be of steel, polymer or composite material and may comprise additional layers or components such as an internal liner or an outer coating. For example, some installation techniques such as S-lay will allow the pipeline 42 to have an outer weight coating of concrete to stabilise it on the seabed 20.

In reel-lay operations, a pipeline 42 is initially spooled onto and stored on a reel on an installation vessel 44, which visits a coastal spoolbase at which the pipeline is fabricated. During installation offshore, the pipeline 42 is unspooled from the reel and then overboarded into the sea to hang from the vessel as a catenary. However, for the purposes of the invention, S-lay and J-lay methods may be preferred for installing a pipeline 42 of suitably large diameter.

In S-lay operations, the pipeline 42 is assembled from pipe joints along a horizontal firing line on an installation vessel 44 offshore. As it is assembled, the pipeline 42 is launched into the sea over a laying ramp or stinger to hang from the vessel 44 as a catenary. The pipeline 42 assumes an S-shape comprising an overbend over the stinger and an opposed sagbend approaching the seabed 20.

Conversely, in J-lay operations as shown in FIG. 3, the pipeline 42 is assembled from pipe joints in an upright J-lay tower 50 on an installation vessel 44 offshore. The pipeline 42 hangs near-vertically to a sagbend approaching the seabed 20, thus assuming a J-shape.

Pipe joints are lifted into the tower 50 to be welded to the top of a suspended pipe string 52. The tower 50 is shown here as being vertical for simplicity but in practice it could be pivoted or gimballed to depart from the vertical. Welding operations are performed at a welding station 54 near the base of the tower 50.

A fixed lower bushing 56 beneath the welding station 54 and a travelling upper bushing or clamp 58 on the tower 50 support the pipe string 52 in alternation. The lower bushing 56 and the travelling clamp 58 cooperate in a 'hand-over-hand' arrangement to lower the pipe string 52 as successive pipe joints are added.

After the pipeline 42 has been installed, a power cable 34 extends from the accessories 46, for example to connect them to an electrical power grid via a control system as in the first embodiment. Similarly, each accessory 46 provides a convenient foundation or support for a respective tidal turbine 40, which again is an optional feature to generate supplemental electricity from subsea currents. Again, anchors such as staples or pins could be spaced along the pipeline 42 to fix the pipeline 42 to the seabed 20, but such anchors are not shown in this drawing.

FIGS. 4 to 11 exemplify various arrangements for the pumping and power-generation facilities that may be integrated into, or distributed among, the towheads 14, 16 of the unit 10 shown in FIGS. 1 and 2 or the modules 46 of the pipeline 42 shown in FIG. 3. Again, like numerals will be used for like features. Those skilled in the art will appreciate how some features of any of these embodiments can be mixed or exchanged with features of others of these embodiments.

FIGS. 4 and 5 show a towhead 14 at an end of a pipeline bundle 12 in the unit 10 of FIGS. 1 and 2. Another towhead 16 could be at the other end of the bundle 12 but it has been omitted for clarity. All or some of the pumping and generating equipment shown here in the towhead 14 could instead be located in the other towhead 16, or could be duplicated or mirrored between the towheads 14, 16.

In each case, the bundle 12 comprises a group of pipes 60 extending in parallel between bulkheads 62 that close and seal respective ends of each pipe 60. The pipes 60 are held together by transverse spacers 64 spaced along the length of the bundle 12. Collectively, the pipes 60 define an energy storage volume from which water can be pumped out to charge the unit 10 and that can be flooded to generate electricity from the inrushing flow of water.

The bulkheads 62 are shared between the pipes 60 in this example but there could instead be individual bulkheads for each pipe 60. Here, at least one of the common or shared bulkheads 62 comprises a manifold chamber 66 that connects the pipes 60 to each other to form a common energy storage volume.

The bundles 12 in FIGS. 4 and 5 differ from each other to show two possible configurations. Specifically, the pipes 60 of the bundle 12 in FIG. 4 are contained within an external carrier pipe 68 whereas in FIG. 5, the pipes 60 of the bundle 12 surround a central core pipe 70 and there is no carrier pipe. In this example, the central core pipe 70 serves a solely structural purpose but it would of course be possible for the central core pipe 70 to perform a similar energy-storage function to the surrounding pipes 60 that are supported by it.

FIGS. 4 and 5 also show different layouts for the pumping and generating equipment. In each case, the generating equipment comprises a turbine 72, exemplified here as a Francis turbine. An inlet 74 of the turbine 72 opens to the surrounding sea to admit water under hydrostatic pressure. An outlet 76 of the turbine 72 communicates with the energy storage volume defined by the pipes 60, to direct an outflow of water through the associated bulkhead 62 and into the pipes 60 via the manifold chamber 66 within the bulkhead 62.

The turbine 72 drives a generator 78 that is connected to a power cable 34 for onward transmission of electrical power when the turbine 72 spins in a flow of inrushing water. The turbine 72 and the generator 78 are coaxial and may, as shown, turn together about an axis that is substantially parallel to the longitudinal direction of the bundle 12.

A valve 80, exemplified here as a ball valve, is shown here downstream of the turbine 72 between the bulkhead 62 and the turbine 72 so as to close the outlet 76. The valve 80 could instead be upstream of the turbine 72 so as to close the inlet 74. When the valve 80 is closed, the unit 10 is in a stand-by mode ready to be charged with energy by emptying the pipes 60 against hydrostatic pressure or to be discharged by flooding the pipes 60 under hydrostatic pressure. However, the valve 80 is shown here as being open to allow water to flow through the turbine 72 when the unit 10 is being charged or discharged.

In FIG. 4, the turbine 72 is reversible to serve as a pump when driven by the generator 78 that then serves as a motor. In pumping mode, with the valve 80 open, the inlet 74 and the outlet 76 of the turbine 72 are reversed in function as the turbine 72 then draws water from within the pipes 60 and expels that water into the surrounding sea.

In FIG. 5, on the other hand, pumping duties to empty the pipes 60 are shared with, or transferred to, a dedicated pump 82 that also communicates with the manifold chamber 66 in the bulkhead 62. The pump 82 may be driven electrically or hydraulically through a power line 84. If the pump 82 is driven hydraulically, the necessary hydraulic pressure is suitably generated by a separate electric pump (not shown) so as to convert excess electrical power from the grid into energy stored by the unit 10.

A pump valve 86, also exemplified here as a ball valve, is shown here upstream of the pump 82 between the bulkhead 62 and the pump 82 to close an inlet 88 of the pump 82 adjacent to the bulkhead 62. The pump valve 86 could instead be downstream of the pump 82 so as to close an outlet 90 of the pump 82 remote from the bulkhead 62.

FIG. 5 shows the system in a discharge mode in which the valve 80 associated with the turbine 72 is open and the pump valve 86 is closed. The states of those valves 80, 86 will be reversed or toggled when the pump 82 is active and the system is therefore in a charging mode, in which case the pump valve 86 is open while the valve 80 associated with the turbine 72 is closed. Both valves 80, 86 are closed when the system is in a stand-by mode ready to be charged or discharged in accordance with the needs of a grid to which the unit 10 is connected.

FIGS. 6 and 7 show corresponding pumping and power-generation arrangements in an end module 46A at an end of a pipeline 42 of FIG. 3. Again, like numerals are used for like features. For example, the module 46A is apt to be supported by a mudmat 48 that serves as a foundation.

Another module 46 could be at the other end of the pipeline 42 shown in FIGS. 6 and 7 but it has been omitted for clarity. All or some of the pumping and generating equipment shown here in the module 46A could instead be located in another module 46, or could be duplicated or mirrored between the modules 46.

In these examples, the pipe string 52 of the pipeline 42 defines an energy storage volume from which water can be pumped out when charging with energy and flooded to generate electricity from the inrushing flow of water. The pipe string 52 may be of single-walled construction or of twin-walled pipe-in-pipe (PiP) construction, To illustrate some variants, the pipe string 52 in FIG. 6 is closed by a bulkhead 62 at one end and by a valve 80 at the other end. Also, the pipe string 52 of FIG. 6 is coated with a weight coating 92 of concrete. Conversely, the pipe string 52 of FIG. 7 does not have a weight coating and is closed by bulkheads 62 at both ends.

In FIG. 6, like FIG. 4, the generator 78 is a motor/generator and the turbine 72 is reversible to serve as a pump. The valve 80, here again exemplified as a ball valve and shown in an open position for charging or discharging, is disposed between the outlet 76 of the turbine 72 and the adjacent end of the pipe string 52 that is closed by the valve 80. As before, however, the valve 80 could instead be on the inlet 74 of the turbine 72.

In FIG. 7, like FIG. 5, pumping duties to empty the pipe string 52 are shared with, or transferred to, a dedicated electrically- or hydraulically-driven pump 82. In parallel to the turbine 72, the pump 82 communicates with a manifold chamber 66 in the bulkhead 62 that connects the pump 82 and the turbine 72 to an end of the pipe string 52. As previously, a pump valve 86, also exemplified here as a ball valve, is upstream of the pump 82 between the bulkhead 62 and the pump 82 to close an inlet 88 of the pump 82 adjacent to the bulkhead 62. However, the pump valve 86 could instead be downstream of the pump 82 so as to close an outlet 90 of the pump 82 remote from the bulkhead 62.

Also, like FIG. 5, FIG. 7 shows the system in a discharge mode in which the valve 80 associated with the turbine 72 is open and the pump valve 86 is closed. The states of those valves 80, 86 will be reversed when in a charging mode, and both valves 80, 86 will be closed in a stand-by mode.

Turning next to FIGS. 8 and 9, these drawings show a unit 10 of FIGS. 1 and 2 comprising a pipeline bundle 12 connecting towheads 14, 16. Like FIG. 5, the bundle 12 comprises pipes 60 surrounding a core pipe 70, which pipes 60 are closed at their ends by shared bulkheads 62.

In these examples, the towheads 14, 16 both contain pumping and generating equipment in a mirrored arrangement. As noted above, such an arrangement could be applied to pipes 60 connected by manifold chambers 66 like those in FIGS. 4 and 5. However, in this example, a respective set of pumping and generating equipment is dedicated to each pipe 60 of the bundle 12 as self-contained unit.

In FIG. 8, like FIG. 4, the generators 78 in each towhead 14, 16 are motor/generators and the turbines 72 in each towhead 14, 16 are reversible to serve as pumps. Here, though, each turbine 72 communicates with a respective one of the pipes 60 of the bundle 12 to empty or to fill that pipe 60.

In FIG. 9, like FIG. 5, each towhead 14, 16 comprises a dedicated electrically- or hydraulically-driven pump 82. Here, each pump 82 communicates with a respective one of the pipes 60 of the bundle 12 and acts against hydrostatic pressure to empty that pipe 60 on charging the system. The other end of that pipe 60 communicates with a turbine 72 in the opposite towhead 14, 16 through which water is admitted under hydrostatic pressure to fill that pipe 60 on discharging the system.

It is preferred, but not essential, that pumping and/or generating equipment is located in a structure such as a towhead 14, 16 or an accessory module 46 at an end of a pipeline 42 or bundle 12. In principle, however, a pipeline 42 or bundle 12 used in a power plant of the invention could have its ends closed by passive structures such as bulkheads 62. In that case, pumping and/or generating equipment may be located at, or connected to, an in-line or intermediate location part-way along the length of the pipeline 42 or bundle 12.

Figure 10:
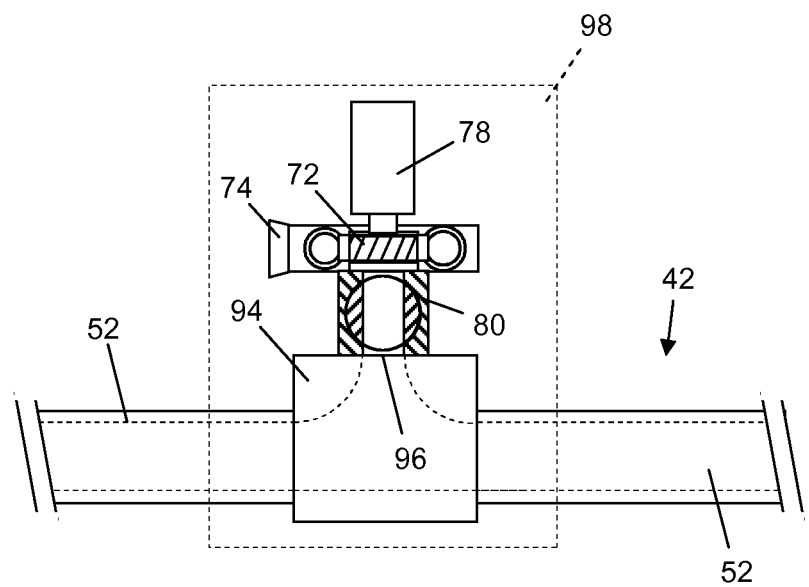
FIG. 10 is a schematic top plan view of an in-line pipeline accessory of the embodiment shown in FIG. 3, the accessory including an integrated turbine and pump arrangement.
Figure 11:
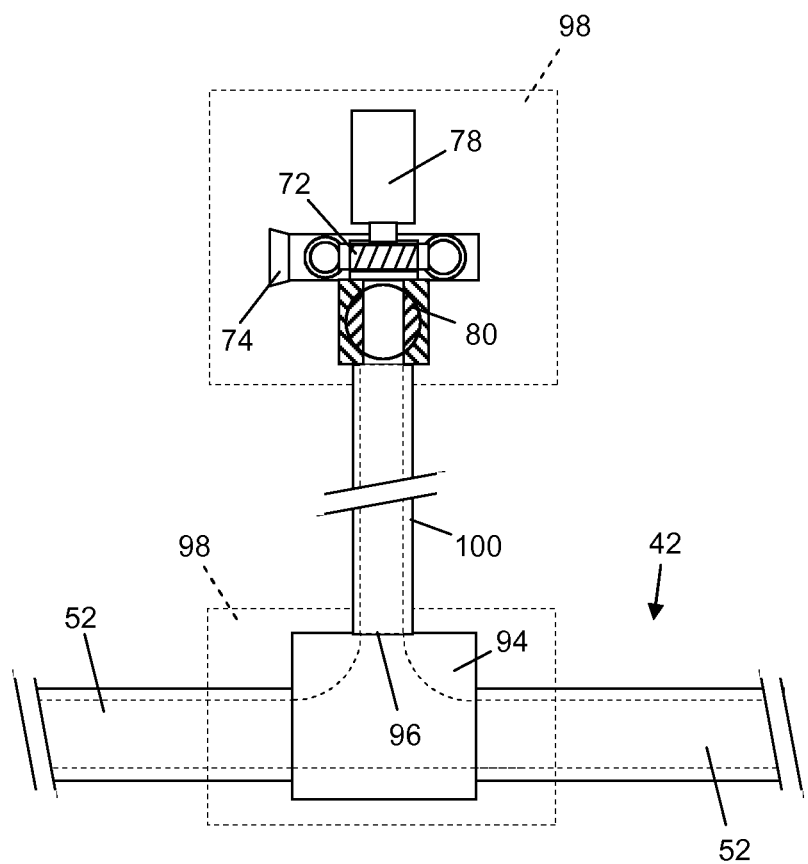
FIG. 11 is a schematic top plan view of a variant of the configuration shown in FIG. 10, in which the turbine and pump arrangement is connected to the pipeline accessory by a spool or jumper pipe.

To illustrate this possibility, FIGS. 10 and 11 of the drawings exemplify options for positioning pumping and/or generating equipment in an intermediate location between the ends of a pipeline 42.

In each case, an in-line module in the form of a tee 94 is incorporated between successive lengths of the pipe string 52. The tee 94 has a side port 96 that communicates between the outlet 76 of a turbine 72 and the interior of the pipeline 42.

As in preceding embodiments, a valve 80 is positioned downstream of the turbine 72 but it could instead be positioned upstream of the turbine to close an inlet 74 of the turbine 72.

FIG. 10 shows the turbine 72 and the tee 94 joined by the valve 80 to form a single structural unit that is apt to be supported on a common foundation 98 such as a mudmat. In contrast, FIG. 11 shows the turbine 72 and the tee 94 as separate structural units that are apt to have their own separate foundations 98. In this case, the turbine 72 and its ancillary equipment is offset laterally from the tee 94 by a spool or jumper pipe 100. Such a pipe 100 could also be used at a terminal or end module 46A so as to space pumping and/or generating equipment away from the main body of the pipeline 42.

As in the preceding embodiments, the turbine 72 and generator 78 are coaxial but in these examples they turn together about an axis that is transverse to, in this case substantially orthogonal to, the longitudinal direction of the pipeline 42.

In the examples shown in FIGS. 10 and 11, the turbine 72 is reversible to serve as a pump and the generator 78 is a motor/generator. However, it will be apparent to the skilled reader how the arrangements shown in FIGS. 10 and 11 could be adapted to include a dedicated pump 80, like the arrangements shown in FIGS. 5, 7 and 9. It will also be apparent to the skilled reader how the arrangements shown in FIGS. 10 and 11 could be adapted to suit a bundle 12 of pipes 60 like those shown in FIGS. 4 and 5, rather than a single pipeline 42.

Figure 12:
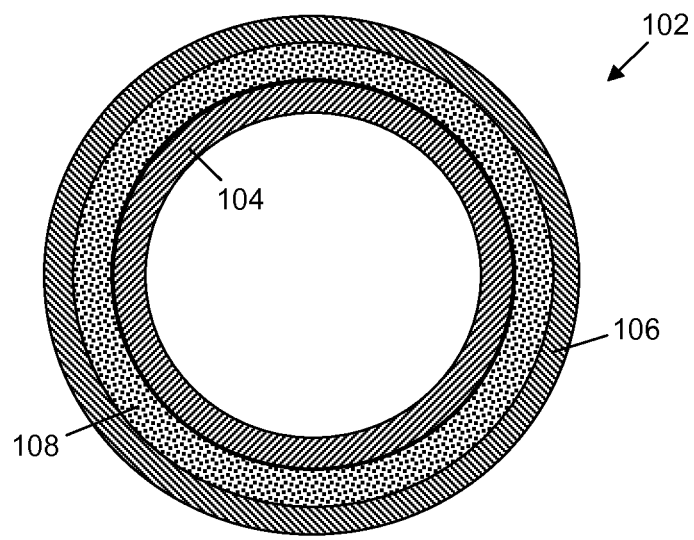
FIG. 12 is a schematic cross-sectional view of an example pipe construction that may be used in embodiments of the invention.

FIG. 12 illustrates a twin-walled pipe-in-pipe (PiP) structure 102 in which an inner pipe 104 and an outer pipe 106 sandwich between them an annular layer 108 of a reinforcement material such as concrete. The concrete or other material of the annular layer 108 is conveniently injected into the annulus between the inner and outer pipes 104, 106 when it is liquid and then sets, solidifies or hardens in the annulus. This significantly increases the resistance of the structure 102 to collapse due to hydrostatic pressure, for example by more than 200%. The weight of concrete in the structure 102 also helps to stabilise the structure 102 on the seabed.

Figure 13:
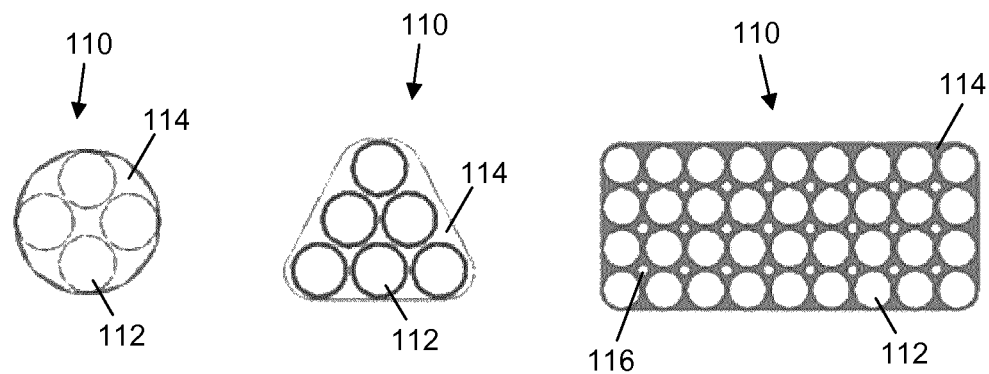
FIG. 13 is a selection of schematic cross-sectional views of various example pipe bundle structures that may be used in embodiments of the invention.

FIG. 13 illustrates various possible configurations of a pipe bundle 110, each comprising a group of pipes 112 extending in parallel along the bundle 110, surrounded by or embedded in a protective shell or matrix 114 of concrete. The pipes 112 may each be made of a plastics material, such as PVC, or a composite material. Smaller pipes, channels or openings 116 may be provided in the interstices between the pipes 112.

The matrix 114 extends along or encapsulates substantially the entire length of the pipe bundle 110 to afford resistance to differential pressure. Thus, as with the concrete-reinforced PiP structure 102 of FIG. 12, the matrix 114 increases the resistance of the pipe bundle 110 to collapse due to hydrostatic pressure, and provides additional weight to stabilise the pipe bundle 110 when installed on the seabed.

The pipe bundle 110 is typically limited to around 200 m in length. However, the combined storage capacity of the bundled pipes 112 compensates for this limitation. In this respect, the pipes 112 may be interconnected for fluid communication between them.

Many other variations are possible without departing from the inventive concept. For example, one or more pumping and power-generation components could be lowered subsequently to pre-installed support structures incorporated in towheads or modules.

The pipeline bundle of the first embodiment could be replaced by a single pipe, potentially of twin-walled pipe-in-pipe (PiP) construction, extending between the towheads to define a subsea energy storage tank.

Whilst turbines are preferred to convert kinetic energy from inrushing water into rotary motion to drive generators, other machines could be used for that purpose instead.

Examples of such machines may comprise screws or pistons.

The invention claimed is:

1. A subsea energy storage installation, comprising:
   at least one elongate rigid pipeline located at a seabed location to serve as a subsea tank; and
   a pumped-storage system having pumping and hydropower generation components for, selectively, converting electricity into potential energy by expelling water from within the tank into the surrounding sea and for generating electricity from an incoming flow of water re-entering the tank under hydrostatic pressure;
   wherein the at least one elongate rigid pipeline forms part of a towable unit that is configured to be lowered to the seabed location, wherein the towable unit comprises a pair of towheads located at opposed ends of the pipeline, the pipeline being arranged, before settling at the seabed location, to be held in tension and to hang as a catenary between the pair of towheads, and wherein the components of the pumped-storage system are located in each of the air of towheads; or
   wherein the at least one elongate rigid pipeline comprises a pipe string configured to be laid at the seabed location, wherein the pipe string comprises a pair of terminal modules located at opposed ends of the pipeline, each of the terminal modules being welded to a respective end of the pipeline to close and seal the respective end of the pipeline, and wherein the components of the pumped-storage system are located in each of the pair of terminal modules.

2. The installation of claim 1, wherein the components of the pumped-storage system are distributed at different locations with respect to the length of the pipeline.

3. The installation of claim 1, wherein the components of the pumped-storage system comprise:
   at least one pump for expelling water from the pipeline; and
   at least one machine-driven generator for generating electricity from the incoming flow of water.

4. The installation of claim 3, wherein the machine is a turbine.

5. The installation of claim 3, wherein the pump and the machine communicate with the pipeline through a common manifold.

6. The installation of claim 3, wherein the pump and the machine communicate with the pipeline through a common bulkhead.

7. The installation of claim 3, wherein the pump and the machine communicate with the pipeline at different longitudinal locations.

8. The installation of claim 7, wherein the pump and the machine communicate with the pipeline through respective bulkheads.

9. The installation of claim 1, wherein the components of the pumped-storage system comprise at least one reversible machine coupled to a generator/motor, the machine being driven by the generator/motor to expel water from the tank and driving the generator/motor to generate electricity from the incoming flow of water.

10. The installation of claim 9, wherein the machine is a reversible turbine.

11. The installation of claim 1, wherein the towable unit comprises a bundle of parallel pipes.

12. The installation of claim 11, wherein the pipes of the bundle are joined to form a common volume.

13. The installation of claim 12, wherein the pipes of the bundle are joined at their ends by a manifold.

14. The installation of claim 13, wherein the manifold is defined by a bulkhead that is common to the pipes of the bundle.

15. The installation of claim 11, wherein the pipes of the bundle are closed by at least one common bulkhead.

16. The installation of claim 11, wherein the pipes of the bundle are separate from each other and have respective pumped-storage systems.

17. The installation of claim 11, wherein the pipes of the bundle are contained within a carrier pipe.

18. The installation of claim 17, wherein the carrier pipe defines a sealed chamber that is resistant to hydrostatic pressure.

19. The installation of claim 11, wherein the pipes of the bundle surround a core pipe.

20. The installation of claim 19, wherein the core pipe and the pipes of the bundle am joined to form a common volume.

21. The installation of claim 1, wherein the pipeline is anchored to the seabed at intervals along the length of the pipeline.

22. The installation of claim 1, wherein the pipeline comprises a weight coating.

23. The installation of claim 1, wherein the pipeline is at least 500 m long.

24. The installation of claim 1, further including at least one tidal turbine supported by the installation.

25. The installation of claim 1, wherein the pumped-storage system has an inlet for receiving the incoming flow of water at substantially the same depth in the sea as the tank.

26. The installation of claim 1, wherein the pumped-storage system has an outlet for the expelled water at substantially the same depth in the sea as the tank.

27. The installation of claim 1, wherein the pipeline is a pipe-in-pipe structure comprising inner and outer pipes defining an annulus between the inner and outer pipes that is filled with a weight filling.

28. The installation of claim 1, wherein the pipeline comprises a bundle of parallel pipes embedded in a matrix or encapsulated by a shell.

29. A method of installing a subsea energy storage installation, the method comprising:
    towing to an offshore installation site a unit that comprises at least one elongate rigid pipeline and a pair of towheads located at opposed ends of het pipeline, wherein the pipeline is arranged to be held in tension between the pair of towheads and to hang between the pair of towheads as a catenary during towing, and wherein each of towheads serves as a support structure for pumping and hydropower generation components of a pumped-storage system; and
    lowering the unit to a seabed location at the installation site where the elongate rigid pipeline serves as a subsea tank.

30. The method of claim 29, comprising lowering the unit with the pumping and hydropower generation components mounted on the support structure.

31. The method of claim 29, preceded by fabricating and testing the unit at an inshore or onshore location.

32. The method of claim 31, comprising assembling a bundle of elongate rigid pipelines.

33. A method of installing a subsea energy storage installation, the method comprising:
    at an offshore installation site, launching a pipe string overboarded from an installation vessel at the surface to a seabed location to serve as a subsea tank; and
    incorporating, at the surface, a pair of terminal modules into the pipe string at opposed ends of the pipeline, each terminal module being welded to a respective end of the pipeline to close and seal the respective end of the pipeline and being a support structure for at least one pumping or hydropower generation component of a pumped-storage system.

34. The method of claim 33, comprising launching the or each module with pumping or hydropower generation components mounted thereon.

35. The method of claim 33, comprising incorporating an at least one additional module at an intermediate position between opposed ends of the pipe string.

36. The method of claim 29, comprising anchoring the installation at the seabed location.

37. The method of claim 29, comprising connecting a subsea power cable to the at least one pumping or hydropower generation component.

38. The method of claim 37, comprising connecting the subsea power cable when the or each component is at the seabed location.

39. The method of claim 33, comprising anchoring the installation at the seabed location.

40. The method of claim 33, comprising connecting a subsea power cable to the at least one pumping or hydropower generation component.

41. The method of claim 40, comprising connecting the subsea power cable when the or each component is at the seabed location.

* * * * *